(12) United States Patent
Korb et al.

(10) Patent No.: US 6,279,604 B1
(45) Date of Patent: Aug. 28, 2001

(54) FLOW AND TEMPERATURE CONTROL VALVE HANDLES

(75) Inventors: Yaakov Korb, Cleveland Heights; John C. Corry, North Olmsted; Eric M. Weber, Medina; William R. Markowitz, Cleveland; Michael J. Kennedy, Strongsville; Alfred Schiazza, Avon Lake; Julius E. Nachod, III, Lakewood, all of OH (US)

(73) Assignee: Moen Incorporated, North Olmstead, OH (US)

( * ) Notice: Subject to any disclaimer, the term of this patent is extended or adjusted under 35 U.S.C. 154(b) by 0 days.

(21) Appl. No.: 09/519,814

(22) Filed: Mar. 6, 2000

(51) Int. Cl.[7] .................................................. F16K 31/44
(52) U.S. Cl. .......................... 137/359; 137/801; 251/288; 251/293
(58) Field of Search .................................. 137/359, 801; 251/293, 286, 288

(56) References Cited

U.S. PATENT DOCUMENTS

| | | | |
|---|---|---|---|
| 1,654,550 | * 1/1928 | Muend ................................. | 137/359 |
| 2,355,736 | * 8/1944 | Klein ................................... | 137/359 |
| 4,186,761 | * 2/1980 | Guarnieri ............................. | 137/315 |
| 4,961,443 | * 10/1990 | Buccicone et al. .................. | 137/315 |
| 5,082,023 | * 1/1992 | D'Alayer de Costemore d'Arc | 137/625.17 |
| 5,257,645 | 11/1993 | Scully et al. ......................... | 251/359 |
| 5,947,149 | * 9/1999 | Mark ................................... | 137/359 |

* cited by examiner

*Primary Examiner*—A. Michael Chambers
(74) *Attorney, Agent, or Firm*—Cook, Alex, McFarron, Manzo, Cummings & Mehler, Ltd.

(57) ABSTRACT

A handle for a shower valve has a fixed portion having a first bearing surface and a movable portion having a second bearing surface. A spring biases the first and second surfaces into engagement. The fixed portion includes a chassis that is threadedly attached to a valve body. The chassis mounts an interchangeable lower shell that has a decorative finish or shape. Rotation of the lower shell causes rotation of the chassis for installation or removal of the handle on the valve body.

30 Claims, 6 Drawing Sheets

FLOW AND TEMPERATURE CONTROL VALVE HANDLES

BACKGROUND OF THE INVENTION

This invention relates to handles and escutcheons for water control valves. Such valves are used, for example, for controlling the flow rate and temperature of a shower, tub, or the like. The escutcheon is a plate that covers an opening in a wall through which the valves extend. The escutcheon and handles typically have a decorative appearance, both as to shape and finish. It is desirable to coordinate the decorative appearance of the escutcheon and handles, not only with each other but with other fixtures such as faucets, shower heads, tub spouts, drain covers, towel bars, towel racks, soap dishes, tissue holders and toothbrush holders. Furthermore, it is preferable to be able to coordinate and/or change the decorative appearance of these items without having to alter or replace the functional components underlying the decorative exteriors. Given these concerns regarding aesthetics, the further desirability of mounting the handles and escutcheon without the use of exposed or visible fasteners will be understandable. At the same time, the handle must provide a predictable, repeatable tactile response without wobble or play to convey a sense of quality. In other words, it has to feel right to the user. The need for replaceable decorative elements without visible fasteners significantly complicates the design of the handles and escutcheons. U.S. Pat. No. 5,257,645 assigned to the present assignee addresses some of these issues. The present invention is an extension of that work.

SUMMARY OF THE INVENTION

The present invention concerns handles for flow control and temperature control valves, such as those used in a shower. It is particularly directed to handles of the type that has interchangeable decorative elements while using common functional components. The handles also permit mounting and centering of a base escutcheon plate with no visible fasteners. Similarly, the handles themselves have no visible fasteners. This makes it straightforward to change the handles' decorative elements and/or the base escutcheon plate without having to change the functional components of the control valves.

The handle of the present invention has a chassis with a first bearing surface. The chassis is removably attached to a valve body. The handle further includes an actuating member connectable to a valve cartridge mounted in the valve body. The actuating member has a second bearing surface. A spring is disposed between the chassis and the actuating member for biasing the first and second bearing surfaces into contact with one another. Controlling the compression of the spring allows control of the pressure on the respective bearing surfaces. The handle parts are designed such that the compression of the spring is not related to the tightness of the any screws or fasteners. An interchangeable lower shell connects to the chassis and is rotatable therewith for installation of the handle. A retaining ring holds the lower shell in place prior to installation.

In another aspect the flow handle is attached to a retaining nut which is sized to reinforce a valve cartridge stop member. The nut prevents radial movement of the stop, thereby increasing its load to failure.

DETAILED DESCRIPTION OF THE INVENTION

Figure 1:
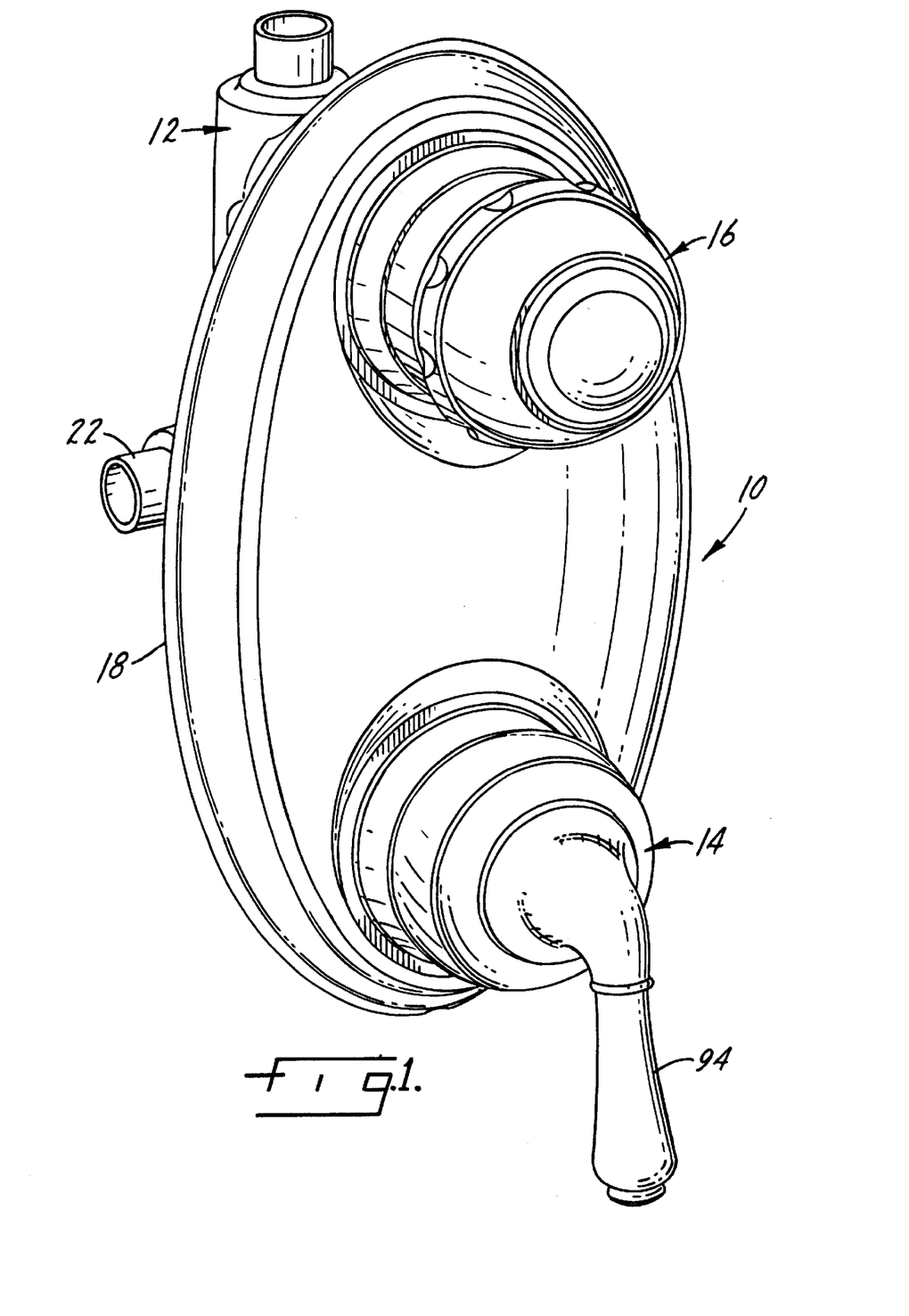
FIG. 1 is a perspective view of the flow handle, temperature knob and base escutcheon, with a portion of the valve body also visible.

The water valve assembly of the present invention is shown generally at 10 in FIG. 1. The assembly includes a valve body 12, a flow handle 14, a temperature knob 16 and a base escutcheon 18. The valve assembly as shown is typically used to control flow of water in a shower or tub. It will be understood that the valve body 12 is behind a wall with portions extending through an opening in the wall. That opening is covered by the base escutcheon 18. The valve body is supported by a bracket (not shown) which is connected both to the body and to the adjacent studs in the wall.

Figure 2:
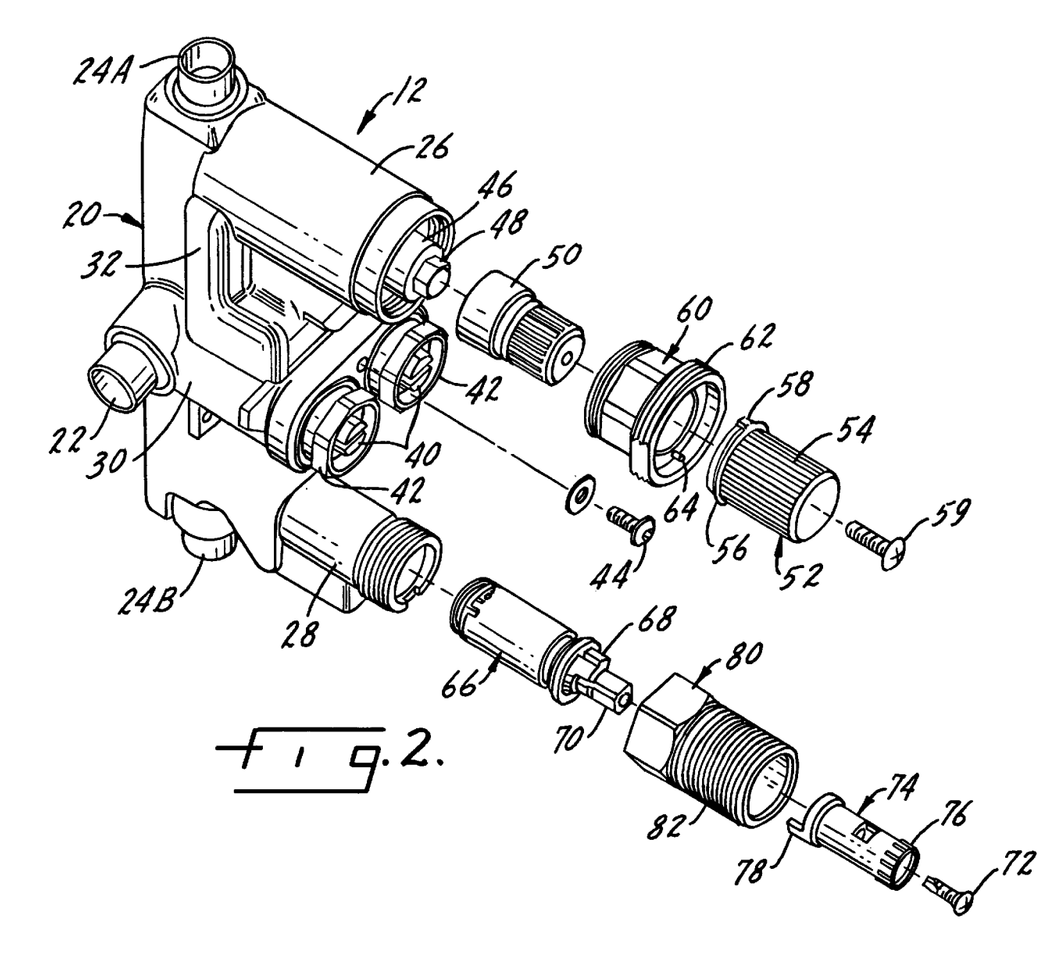
FIG. 2 is an exploded perspective view of the valve body assembly with the base escutcheon and handles removed.
Figure 3:
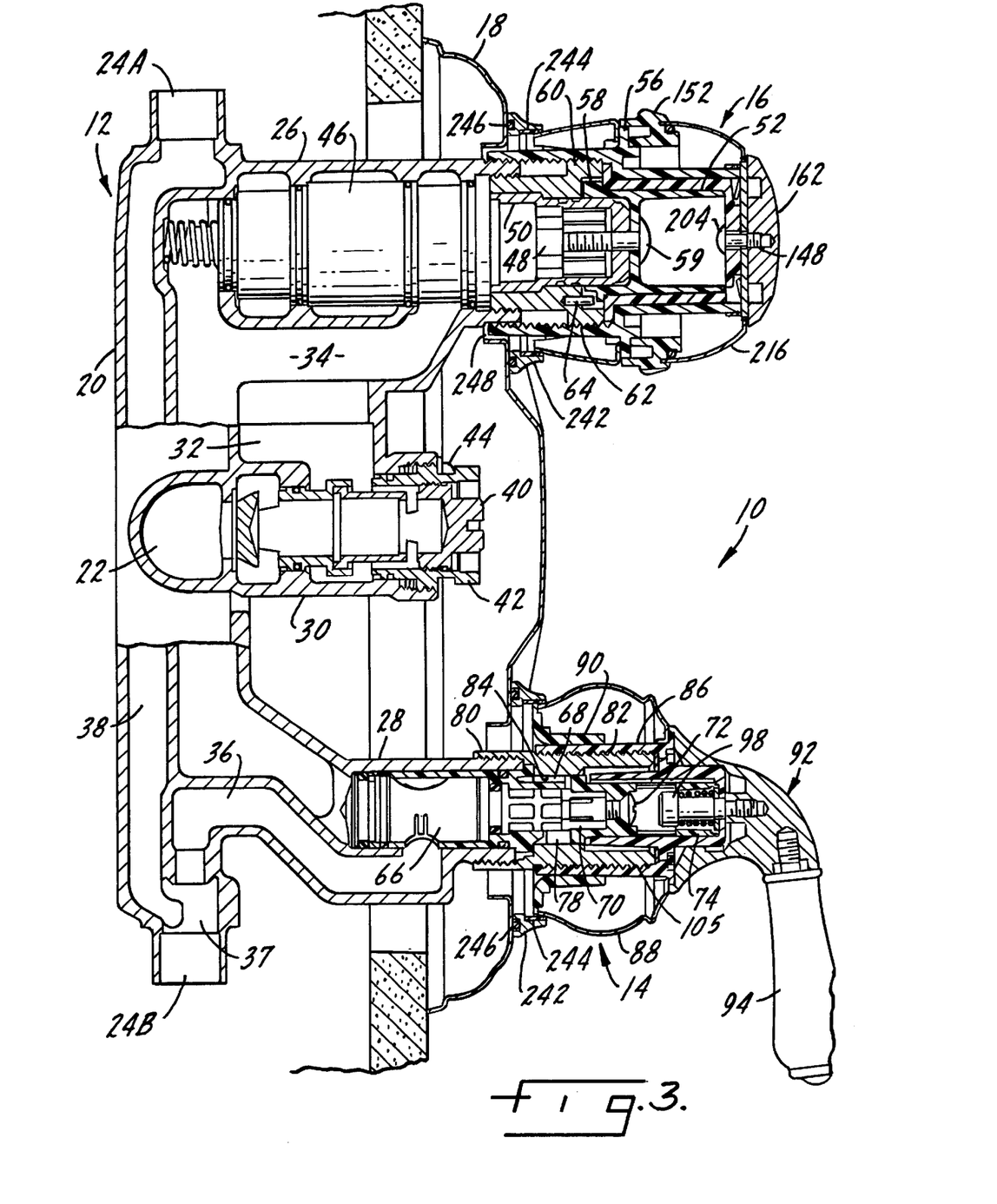
FIG. 3 is a vertical section through the entire valve assembly.

Details of the valve body assembly 12 are shown in FIGS. 2 and 3. The valve body includes a housing 20 having hot and cold water inlets 22 and upper and lower water outlets 24A, 24B. One of the inlets is visible at 22 and the other inlet is similarly horizontally arranged on the other side of the housing. It will be understood that the inlets 22 are connected to suitable hot and cold water supply pipes and the outlets 24A and 24B are connected to pipes extending to, for example, a shower head and tub spout, respectively. The valve housing 20 further includes upper and lower cartridge chambers 26, 28 and two central check valve chambers 30. These chambers are in fluid communication with one another by means of various passages formed in the housing. These passages include: hot and cold water transfer passages (one of which is shown at 32) connecting the check valve chambers 30 to the upper cartridge chamber 26; a mixed water transfer passage 34 connecting the upper cartridge chamber 26 to the lower cartridge chamber 28; an exit passage 36 connecting the lower cartridge chamber 28 to an aspirator 37; and a riser passage 38 connecting the aspirator 37 to the upper outlet 24A.

The two check valve chambers 30 each mount a check valve insert 40. The position of the check valves is controlled by a check stop assembly 42 and a check stop screw 44. The check valve inserts 40 prevent cross flow between the hot and cold water supplies as well as any siphoning into those supplies.

The upper cartridge chamber 26 has a hot and cold water mixing valve 46 mounted therein. Rotation of this valve varies the proportions of hot and cold water flowing to the transfer passage 34 and thus to the valve controlled by the flow handle 14 and to the outlets 24. The mixing valve has a rotatable stem terminating at a nut 48. A cup-shaped spindle 50 fits over the end of the mixing valve. The interior of the spindle 50 has a hexagonal socket which receives the nut 48 so the valve stem and spindle rotate together. The outer end of the spindle 50 is splined to engage internal splines of a spindle extension 52. The spindle extension has external splines 54 which terminate at a flange 56. A stop 58 protrudes from the flange 56. The spindle extension has a central web with an opening therein for receiving a spindle extension screw 59. The screw extends through the web as well as the end face of the spindle 50 and into the stem of the mixing valve 46. This connects the stem, spindle and spindle extension together. Both the spindle 50 and spindle extension 52 may be made from nylon.

A brass retaining nut 60 is threaded into the upper cartridge chamber 26. The retaining nut has a central bore which receives both the mixing valve 46 and the spindle 50. The retaining nut 60 has a shoulder on which external threads 62 are formed. The shoulder provides a wall in which a stop pin 64 is disposed. The shoulder of the retaining nut also defines an annular groove which receives the flange 56 of the spindle extension and allows rotation of the spindle extension within the retaining nut 62 to the extent permitted by engagement of the stop 58 with the stop pin 64.

The lower cartridge chamber 28 receives a flow control valve cartridge 66. This may be a conventional cartridge such as that sold by Moen Incorporated of North Olmsted, OH under their trademark "1248". The cartridge has a fixed outer sleeve with a stop member 68 formed thereon. A rotatable stem 70 is connected by screw 72 to a stem extension 74. The stem extension 74 has splines 76 at its outer end and a stop member 78 at its inner end. The stem extension rotates to the extent permitted by engagement of the stop 78 with the stop 68 on the cartridge sleeve.

The flow control cartridge 66 and stem extension 74 are held fixed in the lower cartridge chamber 28 by a brass retaining nut 80 which is threaded onto the external threads of the chamber. The retaining nut has external threads 82 similar to those at 62 on the retaining nut 60. The retaining nut also has an internal bore 84 whose internal diameter closely matches the external diameter of the stop member 68. This provides radial support for the stop member 68. It can be seen that over-torquing of the stem extension 74 by a user would cause the stop 78 to tend to force stop 68 radially outwardly. The surface of the bore 84 on the retaining nut 80 prevents that from happening and increases the load to failure of the stop member 68.

Having described the valve body assembly 12, attention will now be turned to the flow handle 14. Details of the flow handle are shown in FIGS. 3–9. The flow handle 14 includes a fixed portion and a movable portion or actuating member. The terms fixed and movable refer to the post-installation condition of the components as normally encountered by a user and this terminology allows for the fact that the fixed portion is rotatable during the installation process. The fixed portion includes a chassis 86, a lower shell 88 and a retaining ring 90. The movable portion or actuating member of the handle includes a flow handle elbow 92, an operating handle 94, a lever adapter 96, a shoulder screw 98, a compression spring 100 and a washer 102. Various details of these components will now be described.

Figures 4, 5, 6, 7, 8, 9:
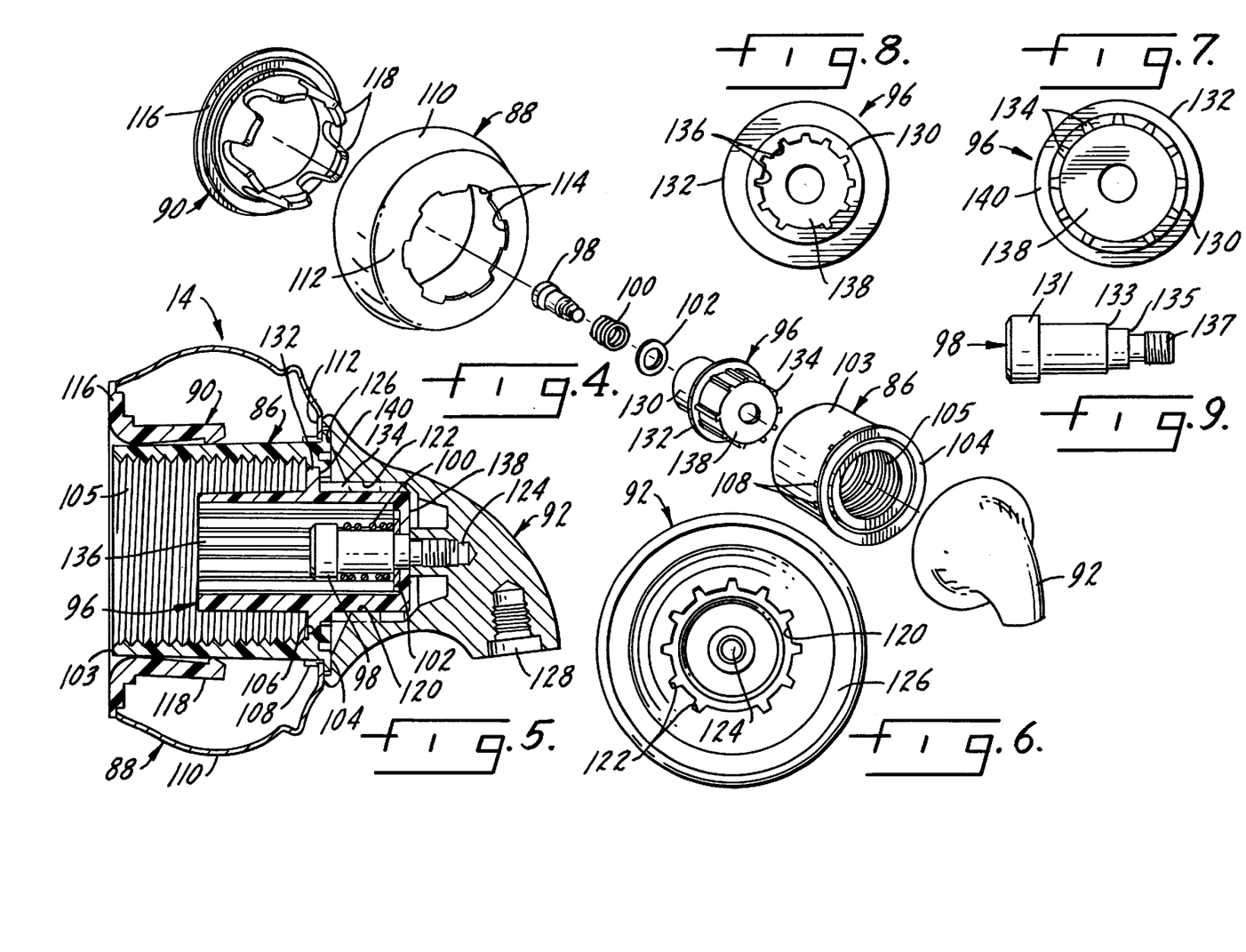
FIG. 4 is an exploded perspective view of the flow handle.
FIG. 5 is an enlarged vertical section of the flow handle assembly.
FIG. 6 is an interior or bottom plan view of the flow handle elbow.
FIG. 7 is an exterior or top plan view of the lever adapter.
FIG. 8 is an interior or bottom plan view of the flow handle lever adapter.
FIG. 9 is a side view of the shoulder screw.

Looking first at the chassis 86, it has a generally cylindrical wall 103 with internal threads 105 and a radially extending flange at one end. The flange surface facing the elbow 92 forms a first bearing surface 104. The portion of the flange extending inwardly of the wall 103 and facing the valve body forms a third bearing surface 106. Spaced around the external surface of the chassis wall at the joint with the flange are a series of protrusions 108 (FIG. 4).

The lower shell 88 has a bulb portion 110 and a generally radial face 112. The radial face has a central opening. Arcuately spaced notches 114 are formed in face 112 at the central opening. The opening is sized to receive the wall 103 of the chassis 86 but not the flange portion of the chassis. Thus, when installed the radial face 112 abuts the flange of the chassis. The chassis' protrusions 108 fit closely into the notches 114 to rotationally lock the lower shell 88 to the chassis 86.

The inner end of the bulb portion 110 joins the retaining ring 90. The retaining ring has a hub 116 from which extend a series of fingers 118. The fingers 118 press against the wall 103 of the chassis to hold the retaining ring 90 and the lower shell 88 in position prior to installation of the complete handle 14 on the valve body. The hub also has an annular groove that receives the inner end of the bulb 110 and provides support therefor.

Turning now to the movable portion or actuating member of the handle 14, the flow handle elbow 92 has a central socket 120 with internal splines 122 formed therein. A central bore 124 is threaded to receive the shoulder screw 98. The outer radius of the elbow's bell portion has a flat portion which defines a second bearing surface 126 (FIG. 6). The bell portion further includes a threaded receptacle 128 for receiving the operating handle 94.

Details of the lever adapter 96 are shown in FIGS. 4, 7 and 8. The lever adapter has a generally cylindrical wall 130 with a central flange 132 and external splines 134 at one end and internal splines 136 at the other end. One end of the lever adapter is closed by an end face 138. The surface of the flange 132 toward the end face 138 defines a fourth bearing surface 140. The closed end of the lever adapter fits into the socket 120 of the flow handle elbow 92 with the elbow's splines 122 engaging the lever adapter's splines 134 to rotationally lock the elbow and lever adapter together while allowing some longitudinal movement between them. As seen in FIG. 5, the shoulder screw 98 fits through an opening in the end face 138 of the lever adapter and threads into the elbow's bore 124.

The shoulder screw's construction is important to the proper functioning of the flow handle 14. looking at FIG. 9, the screw 98 has a head 131, a first boss 133 a second boss 135 and a threaded end portion 137. The end portion 137 fits into the bore 124 of the elbow 92 with second boss 135 abutting the wall surrounding the bore. The length of the screw between the first and second bosses 133 and 135 is slightly greater than the combined thickness of the lever adapter end face 138 and the washer 102. This prevents the first boss 133 from being able to lock the lever adapter end face 138 against the interior of the elbow socket 120. Thus, while the shoulder screw 98 and the elbow 92 are locked together, these components float with respect to the lever adapter 96. The amount of float depends on the amount of compression of the spring 100 and this can be controlled by the length of the spring and the length of the space between the washer 102 and the head 131 of the shoulder screw. That compression is important because it governs the pressure of the mating bearing surfaces. It can be seen that the compression spring 100 tends to urge the lever adapter 96 to the right in FIG. 5 and the shoulder screw 98 and elbow 92 combination to the left, thus clamping the flange of the chassis 86 between the bell of the elbow and the flange 132 of the lever adapter 96. Thus, first and second bearing surfaces 104 and 126 are in engagement, as are the third and fourth bearing surfaces 106 and 140. The amount of clamping pressure at these bearing surfaces is controlled by the compression of spring 100 and not by the amount of torque applied when installing the shoulder screw. This governs the "feel" of the handle as experienced by a user. The spring also eliminates any play or wobble in the movable portions of the handle.

Assembly and installation of the flow handle 14 are as follows. The compression spring 100 is placed over the shoulder screw 98 along with the washer 102. This subassembly is then placed inside the lever adapter 96 with the shoulder screw end portion 137 protruding through the end face 138. The lever adapter slides into the chassis 86 with the flange 132 engaging the flange of the chassis. The socket 120 of elbow 92 then receives the lever adapter's closed end with splines 122 and 134 engaging one another. The shoulder screw is threaded into bore 124. Tightening the screw will draw the first and second bearing surfaces 104, 126 and third and fourth bearing surfaces 106, 140 into engagement. Next the lower shell 88 is placed on the chassis and arranged so the protrusions 108 fit in notches 114. Finally the retaining ring 90 slides on to hold the lower shell in place until such time as the handle is installed on the valve body. Such installation entails rotating the lower shell, and the chassis 86 with it, so the chassis threads 105 engage threads 82 of the retaining nut 80.

Details of the temperature knob 16 will now be described in conjunction with FIGS. 3 and 10–16. As with the flow handle 14, the temperature knob 16 includes a fixed portion and a movable portion or actuating member. The fixed portion includes a retaining ring 142, a lower shell 144 and a chassis 146. The movable portion of the temperature knob includes a capture screw 148, a spline shaft 150, a grip ring 152, an O-ring 154, an upper shell 156, a retaining disk 158, an end cap gasket 160 and an end cap 162.

Figures 10, 11, 12:
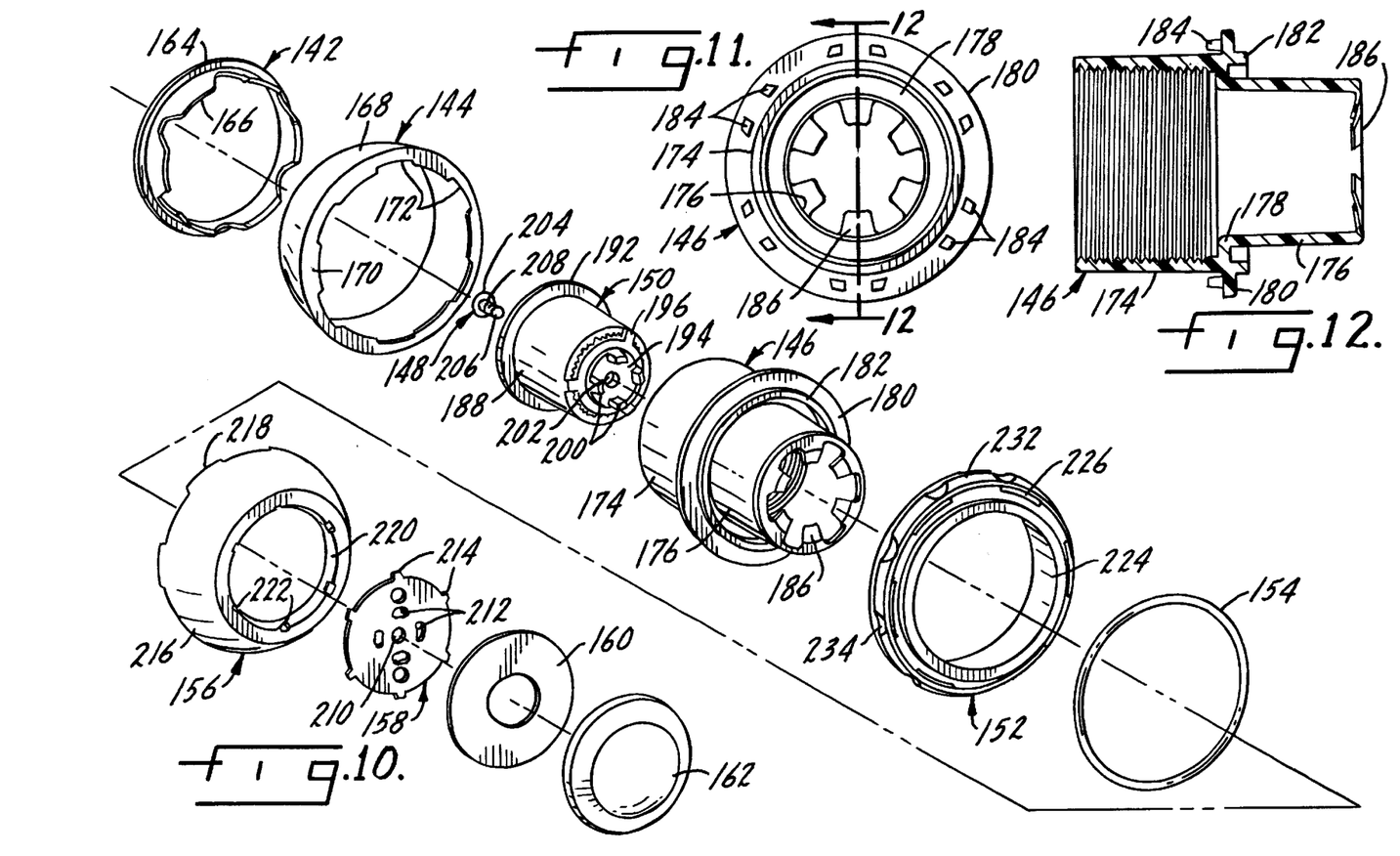
FIG. 10 is an exploded perspective view of the temperature knob.
FIG. 11 is an interior or bottom plan view of the temperature knob chassis.
FIG. 12 is a sectional view taken on line 12—12 of FIG. 11.

Looking now at the details of the fixed portion, the retaining ring 142 is similar to the retaining ring 90 of the flow handle. The retaining ring has a hub 164 and a plurality of spaced fingers 166. The fingers are arranged to press resiliently against the outer surface of the chassis and hold the lower shell 144 in position on the chassis prior to installation of the temperature knob on the valve body.

The lower shell 144 has a bulb portion 168 which terminates at one end in a radial face 170. The radial face has a plurality of notches 172 formed therein. The notches receive protrusions in the chassis to rotationally lock the lower shell and chassis together. The lower shell can have different shapes, or it can be made of different materials, e.g., brass or ceramic, or have a variety of finishes to accommodate specific ornamental or aesthetic considerations.

The chassis 146 includes two concentric cylindrical walls defining a major tube 174 and a minor tube 176. The major and minor tubes are joined at a shoulder 178. Extending radially from the exterior surface of the major tube 174 is a flange 180. Extending axially from the shoulder is a rim 182. On the side of the flange opposite the rim 182 are a series of protrusions 184 (FIG. 11). The protrusions extend into the notches 172 of the lower shell 144 as described above. Extending radially inwardly from the outer end of the chassis minor tube 176 are a plurality of spring members 186. The spring members are resiliently molded into the minor tube 176. In their natural, unstressed position the spring members 186 angle toward the major tube 174.

Figure 13:
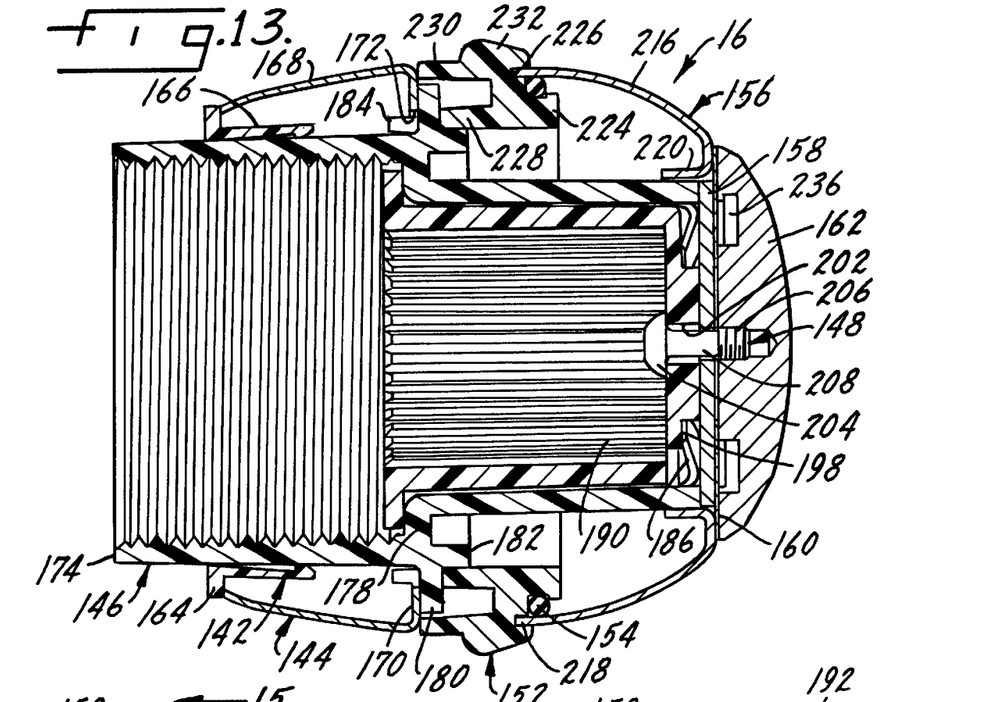
FIG. 13 is an enlarged vertical section of the temperature knob assembly.
Figures 14, 15, 16:
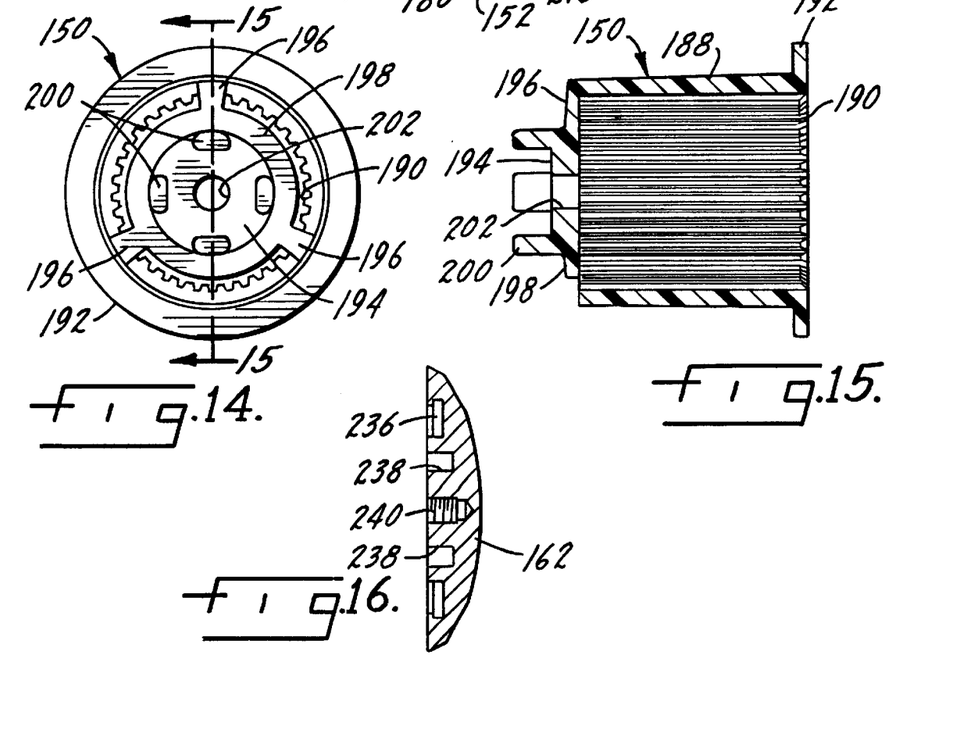
FIG. 14 is an exterior or plan view of the spline shaft of the temperature knob.
FIG. 15 is a longitudinal section through the spline shaft taken on line 15—15 of FIG. 14.
FIG. 16 is a section through the end cap.

Looking now at the movable portion of the temperature knob, details of the spline shaft 150 are shown in FIGS. 14 and 15. The spline shaft has a cylindrical wall 188 having internal splines 190 and a radial flange 192 at one end. The other end of the spline shaft has an end face 194. The end face is connected to the wall 188 by three tabs 196. The tabs 196 are designed to fail in the event of over-torquing. They will break before the cartridge does. This protects the cartridge from failure. The end face 194 includes a circular race 198 which provides a bearing surface for the spring members 186. Located interiorly of the race are four extensions or prongs 200. The center of the end face has an aperture 202. The capture screw 148 fits through this aperture. It will be noted in FIG. 13 that the capture screw has a head 204 at one end and self-tapping threads 206 at the other and an intervening unthreaded shank portion 208. It is the unthreaded shank portion that resides in the aperture 202 so there is no threaded connection between the capture screw and the end face 194.

FIG. 10 illustrates details of the retaining disk 158. It has a central opening 210 through which the capture screw 148 extends. The opening 210 is sized so that the self-tapping threads of the capture screw must thread their way through the opening but once they do the unthreaded shank portion 208 is adjacent the opening 210. As the trailing thread of the capture screw breaks through the disk 158 it cuts a groove in the outer face of the disk, creating a fit which is snug and custom to that assembly. Other features of the retaining disk include four oval-shaped passages 212. These passages receive the prongs 200 of the spline shaft to rotationally lock the spline shaft and retaining disk together. Completing the retaining disk are six radially directed tabs 214 around the external periphery. These tabs engage notches in the upper shell 156 to rotationally lock the upper shell and retaining disk together.

In this regard the upper shell 156 has a bulb portion 216 bounded at its lower or interior end by six tabs 218. The outer or exterior end has a turned over edge 220 in which notches 222 are formed for receiving the tabs 214 of the retaining disk.

The grip ring 152 has an annular body member 224 with six notches 226 formed in its exterior or outer face. The notches 226 receive the tabs 218 of the upper shell to rotationally lock the upper shell and grip ring together. The body member 224 also has a seat for receiving the O-ring 154. The interior edge of the grip ring body member 224 is separated into inner and outer legs 228 and 230 (FIG. 13). The outer leg 230 surrounds the circumferential surface of the flange 180 of the chassis. The inner leg 228 engages the corner formed by the radial face of the flange 180 and the rim 182. The outer periphery of the grip ring body member has a bead 232 with a series of depressions 234 therein. The bead is made of material which is easy to grip when wet. The depressions 234 aid a user's ability to grasp and rotate the grip ring 152.

Completing the movable portion of the temperature knob are the end cap gasket 160 and the end cap 162. FIG. 16 shows a section through the end cap. It has a groove 236 for making the cap lighter if it is made of metal. There are four sockets, two of which are shown at 238 for receiving the prongs 200 of the spline shaft. A central bore 240 has threads for receiving the threads of the capture screw. If the end cap is made of ceramic material, an insert can be placed in the bore to provide the threaded surface. The end cap can have a decorative outer surface matching that of the lower shell 144.

The assembly procedure for the temperature knob is as follows. The O-ring 154 is placed on the seat of the grip ring 152. The upper shell 156 is placed onto the grip ring with the tabs 218 fitting into notches 226. Next the retaining disk 158 is mounted on an assembly fixture. And the upper shell/grip ring combination is placed on the disk with tabs 214 placed in notches 222. Then the chassis is slipped into the upper shell with the minor tube 176 fitting inside the turned over edge 220. This is followed by placement of the spline shaft 150 into the chassis. Next the capture screw 148 is placed through the aperture 202 of the spline shaft and the central opening 210 in the retaining disk. Once the capture screw threads pop through the retaining disk, the screw can turn freely in the spline shaft end face and retaining disk. The capture screw threads do engage those of the bore 240 in the end cap, drawing the end cap and retaining disk against the spline shaft end face. This compresses the spring members 186 of the chassis. The compressed spring members engage the race 198, urging the spline shaft, retaining disk, end cap, upper shell and grip ring toward the valve body. This presses the end face of the inner leg 228 of the grip ring against the outer surface of the flange 180. Thus, the inner leg and flange form second and first, respectively, bearing surfaces for the movable portion of the temperature knob against the fixed portion. The temperature knob assembly is completed by placing the lower shell 168 onto the major tube 174 of the chassis. The chassis protrusions 184 extend into the notches 172 of the lower shell, locking them together. Finally, the retaining ring 142 is pressed onto the major tube portion of the chassis to hold the lower shell in place until such time as the chassis is screwed onto the valve body.

Installation of the temperature knob on the valve body is achieved by taking the assembled temperature knob and placing the major tube portion 174 of the chassis over the retaining nut 60. Rotation of the lower shell 144 and chassis 146 causes the internal threads of the chassis to engage the external threads of the nut. Internal splines 190 of the spline shaft engage external splines 54 of the spindle extension 52 as the temperature knob is installed. The splines allow for some variation in the relative axial positions of the knob and valve body.

It will be noted that the handle position of both the temperature knob and flow handle is fixed regardless of the wall thickness. The splines of the spline shaft or lever adapter are engaged with those of the stem extension 74 or spindle extension 52 to allow for variation of the valve body position.

As the temperature knob and flow handle are screwed into place, the lower edge of the lower shells engage a ring escutcheon 242. The ring escutcheon includes an outer seat which receives a compression ring 244. The inner surface of the ring escutcheon has a groove that receives an O-ring 246. The ring escutcheon can have a decorative exterior that will match that of the lower shell and end cap. It will also be noted in FIG. 3 that the inner end of the temperature knob chassis, that is the inner end of the major tube 174 fits within an indentation 248 in the base escutcheon 18. The engagement of the major tube 174 with the indentation 248 centers and aligns the base escutcheon 18 with respect to the center lines of the valve body cartridge chambers 26, 28. With the base escutcheon thus centered, tightening of the flow handle and temperature knob chassis onto the retaining nuts will clamp the base escutcheon against the wall, holding it firmly in place even through there are no external fasteners on the base escutcheon.

Another advantage of the present invention is that all of the parts are common to the various designs except the lower shell and handles. Thus, changes to decorative elements can be made without having to alter the basic construction of the valve body, cartridges and handles.

While a preferred form of the invention has been shown and described, it will be realized that alterations and modifications may be made thereto without departing from the scope of the following claims. For example, while the handles are shown oriented as they would be for a shower, the orientation could be otherwise. Also, certain aspects of the invention are applicable to a single handle and need not necessarily be used in installations having both a flow valve and a temperature valve. Also, as used herein, controlling water flow means controlling either its flow rate, temperature or both.

What is claimed is:

1. In a valve for controlling water flow comprising a valve body having at least one inlet connectable to a water supply and at least one outlet, and a valve cartridge mounted in the valve body and actuatable for controlling water flow from the inlet to the outlet, the improvement comprising a handle for actuating the valve cartridge. the handle comprising:

a) a chassis attached to the valve body and having a first bearing surface;

b) an actuating member connected to the valve cartridge and having a second bearing surface, the first and second bearing surfaces being arranged for sliding contact with respect to one another;

c) spring means between the chassis and the actuating member for biasing the first and second bearing surfaces into contact with one another.

2. The valve of claim 1 further characterized in that the spring means are integrally formed in the chassis and the actuating member comprises a spline shaft and an end cap assembly on opposite sides of the spring means and connected together by a capture screw to compress the spring means between them.

3. The valve of claim 2 wherein the end cap assembly further comprises a retaining disk connected to the spline shaft and the actuating member further comprises an upper shell connected to the retaining disk.

4. The valve of claim 3 further comprising a grip ring connected to the upper shell, the grip ring including the second bearing surface.

5. The valve of claim 2 wherein the end cap assembly comprises a retaining disk connected to the spline shaft and a decorative end cap threadedly engaging the capture screw.

6. The valve of claim 5 wherein the capture screw has a threaded end portion, an unthreaded shank and a head, the shank extending through the spline shaft and retaining disk, with the head of the capture screw abutting the spline shaft and the end portion of the capture screw engaging the decorative end cap.

7. The valve of claim 1 further characterized in that the chassis has a generally cylindrical wall and the spring means are formed on said wall extending radially inwardly therefrom and the actuating member comprises a cylindrical spline shaft that fits concentrically inside the chassis wall and has an end face engageable with the spring means of the chassis, the actuating member further including an end cap assembly on the opposite side of the spring means from the spline shaft end face, the end face and end cap assembly being connected together by a capture screw to compress the spring means between them.

8. The valve of claim 7 wherein the end cap assembly further comprises a retaining disk connected to the spline shaft's end face and a decorative end cap threadedly engaging the capture screw.

9. The valve of claim 8 wherein the capture screw has a threaded end portion, an unthreaded shank and a head, the shank extending through the spline shaft's end face and the retaining disk, with the head of the capture screw abutting the spline shaft's end face and the end portion of the capture screw engaging the decorative end cap.

10. In a valve for controlling water flow comprising a valve body having at least one inlet connectable to a water supply and at least one outlet, and a valve catridge mounted in the valve body and actuatable for controlling water flow from the inlet to the outlet the improvement comprising a handle for actuating the valve cartridge, the handle comprising:
   a) a chassis attached to the valve body and having a first bearing surface;
   b) an actuating member connected to the valve cartridge and having a second bearing surface;
   c) spring means between the chassis and the actuating member for biasing the first and second bearing surfaces into contact with one another and wherein the chassis further comprises a third bearing surface and the actuating member comprises an elbow with the second bearing surface formed therein and a lever adapter connected to the elbow and having a fourth bearing surface, the spring means biasing the third and fourth bearing surfaces into contact with one another.

11. The valve of claim 10 further comprising a shoulder screw for joining the elbow and lever adaptor, the shoulder screw having a head and a boss, the spring means bearing against the head and biasing it such that the boss is spaced from the lever adaptor.

12. In a valve for controlling water flow comprising a valve body having at least one inlet connectable to a water supply and at least one outlet, and a valve cartridge mounted in the valve body and actuatable for controlling water flow from the inlet to the outlet, the improvement comprising a handle for actuating the valve cartridge, the handle comprising:
   a) a chassis removably connected to the valve body;
   b) an actuating member connected to the valve cartridge the actuating member being mounted for rotation on the chassis;
   c) a lower shell removably attached to the chassis and having a decorative finish, the lower shell being replaceable without replacing the actuating member.

13. The valve of claim 12 wherein the actuating member further comprises a decorative member having a finish matching that of the lower shell.

14. The valve of claim 13 wherein the decorative member is an end cap.

15. The valve of claim 13 wherein the decorative member is an operating handle.

16. A valve unit for controlling water flow comprising:
   a valve body having inlets connectable to hot and cold water supplies and at least one outlet;
   first and second valve cartridoes mounted in the valve body and actuatable for controlling water flow from the inlet to the outlet;
   first and second handles connected to the valve cartridges;
   a base escutcheon at least partially surrounding the valve cartridges, the base escutcheon being held in place by the first and second handles.

17. The valve unit of claim 16 wherein the first and second handles each have a movable portion and a fixed portion with the fixed portion engaging, the base escutcheon.

18. The valve unit of claim 17 wherein the fixed portion includes a ring escutcheon.

19. The valve unit of claim 17 wherein the fixed portion includes a chassis connected to the valve body, a lower shell attached to the chassis and a ring escutcheon disposed between the lower shell and the base escutcheon.

20. The valve unit of claim 19 wherein the chassis threadedly engages the valve body and the lower shell interlocks with the chassis such that rotation of the lower shell causes the chassis to move relative to the valve body.

21. The valve unit of claim 16 wherein each handles comprises:
   a) a chassis attached to the valve body and having a first bearing surface;
   b) an actuating member connected to the valve cartridge and having a second bearing surface;
   c) spring means between the chassis and the actuating member for biasing the first and second bearing surfaces into contact with one another.

22. The valve of claim 21 wherein the chassis further comprises a third bearing surface and the actuating member comprises an elbow with the second bearing surface formed therein and a lever adapter connected to the elbow and having a fourth bearing surface, the spring means biasing the third and fourth bearing surfaces into contact with one another.

23. The valve of claim 22 further comprising a shoulder screw for joining the elbow and lever adaptor, the shoulder screw having a head and a boss, the spring means bearing against the head and biasing it such that the boss is spaced from the lever adaptor.

24. The valve of claim 16 wherein the base escutcheon has first and second openings and at least one of said handles extends into one of the openings to align the base escutcheon with the valve cartridges.

25. A valve for controlling water flow comprising a valve body having at least one inlet connectable to a water supply and at least one outlet, an actuating member mounted on the valve body for rotary movement about an axis and including a movable stop, a valve cartridge mounted in the valve body and connected to the actuating member for controlling water flow from the inlet to the outlet, the valve cartridge including a fixed stop engageable with the movable stop to limit movement of the actuating member, and a retaining nut mounted on the valve body and abutting the fixed stop.

26. The valve of claim 25 wherein the retaining nut is disposed radially of the fixed stop to restrain radial deflection of the fixed stop in the event of over-torquing of the movable stop.

27. A handle for actuating a valve cartridge within a valve body, comprising a fixed portion threadedly engageable with the valve body and defining a first bearing surface, a movable portion connectable to the valve cartridge and having a second bearing surface, and a spring between the fixed and movable portions for urging the first and second bearing surfaces into engagement with one another with controlled pressure of one bearing surface on the other.

28. The handle of claim 27 wherein the fixed portion includes a chassis removably connected to the valve body, a lower shell removably attached to the chassis and a retaining ring, engageable with the chassis and lower shell to hold the shell on the chassis prior to installation on the valve body.

29. In a valve for controlling water flow comprising a valve body having at least one inlet connectable to a water supply and at least one outlet, and a valve cartridge mounted in the valve body and actuatable for controlling water flow from the inlet to the outlet, the improvement comprising a handle for actuating the valve cartridge, the handle comprising:

a) a chassis attached to the valve body and having a first bearing surface;

b) an actuating member connected to the valve cartridge and having a spline shaft and an end cap assembly, one of the spline shaft and end cap assembly including a second bearing surface;

c) spring means between the chassis and the actuating member for biasing the first and second bearing surfaces into contact with one another; and d) a capture screw connecting the spline shaft and end cap assembly to compress the spring means between them, the capture screw having self-tapping threads for engaging the end cap assembly.

30. The valve of claim 29 wherein the end cap assembly further comprises a retaining disk connected to the spline shaft and the self-tapping threads extend through the retaining disk.

* * * * *